(12) United States Patent
Karrer et al.

(10) Patent No.: US 7,117,730 B2
(45) Date of Patent: Oct. 10, 2006

(54) METHOD AND DEVICE FOR SIMULATING SLIP ON VEHICLE TEST BENCHES

(75) Inventors: Mathias Karrer, Wertingen (DE); Andreas Mund, Eime (DE)

(73) Assignee: RENK Aktiengesellschaft, Augsburg (DE)

( * ) Notice: Subject to any disclaimer, the term of this patent is extended or adjusted under 35 U.S.C. 154(b) by 202 days.

(21) Appl. No.: 10/616,666

(22) Filed: Jul. 10, 2003

(65) Prior Publication Data

US 2004/0007046 A1 Jan. 15, 2004

(30) Foreign Application Priority Data

Jul. 12, 2002 (DE) ................. 102 31 525

(51) Int. Cl.
*G01L 3/02* (2006.01)
(52) U.S. Cl. ...................................... 73/123
(58) Field of Classification Search ............ 73/121, 73/123, 125, 129, 865.6, 146; 303/122–122.5
See application file for complete search history.

(56) References Cited

U.S. PATENT DOCUMENTS

| | | | |
|---|---|---|---|
| 2,583,201 A * | 1/1952 | Bennett | 73/117 |
| 3,814,354 A * | 6/1974 | Reese | 244/103 S |
| 4,160,378 A | 7/1979 | Himmler | |
| 4,171,641 A | 10/1979 | Landsness | |
| 4,344,324 A | 8/1982 | Langer | |
| 5,347,842 A | 9/1994 | Pottinger et al. | |
| 5,621,168 A | 4/1997 | Kim et al. | |
| 5,945,598 A * | 8/1999 | Enright | 73/123 |
| 6,247,348 B1 | 6/2001 | Yamakado et al. | |
| 6,427,528 B1* | 8/2002 | Yamakado et al. | 73/121 |
| 6,843,114 B1* | 1/2005 | Pradier et al. | 73/146.5 |
| 2004/0173014 A1* | 9/2004 | Pradier et al. | 73/146 |

FOREIGN PATENT DOCUMENTS

| | | |
|---|---|---|
| DE | 26 11 123 | 5/1984 |
| DE | 30 07 362 | 11/1985 |
| DE | 37 01 254 | 8/1988 |
| DE | 89 07 621.4 | 9/1989 |
| DE | 38 30 048 C1 | 12/1989 |
| DE | 195 05 533 | 8/1996 |
| DE | 195 05 533 A1 | 8/1996 |
| DE | 298 15 234 U1 | 2/1999 |
| DE | 198 41 944 A1 | 3/2000 |
| DE | 100 04 208 A1 | 8/2001 |
| DE | 100 22 355 A1 | 11/2001 |
| EP | 0 512 514 * | 11/1992 |
| EP | 0 689 042 | 12/1995 |

(Continued)

OTHER PUBLICATIONS

French Preliminary Examination Report dated Jun. 24, 2005 issued for French Application No. 0 350 238.

*Primary Examiner*—Robert Raevis
(74) *Attorney, Agent, or Firm*—Cohen, Pontani, Lieberman & Pavane

(57) ABSTRACT

A device for simulating slip on vehicle test benches wherein a vehicle wheel which rolls on a movable testing surface of a test device such as a test roller or flat belt and performs the object of changing the frictional force between the wheel and the testing surface without necessarily having to change the coefficient of friction A lifting/lowering device changes the contact force $F_A$ of the wheel in a predeterminable way from the tire to an apparatus as the wheel rotates.

14 Claims, 2 Drawing Sheets

FOREIGN PATENT DOCUMENTS

| | | |
|---|---|---|
| EP | 0 786 657 A2 | 7/1997 |
| EP | 0 982 566 | 3/2000 |
| EP | 0 775 903 B1 | 9/2001 |
| FR | 2187178 | 12/1973 |
| GB | 1 464 614 | 2/1977 |
| JP | 06156934 A | 6/1994 |

\* cited by examiner

METHOD AND DEVICE FOR SIMULATING SLIP ON VEHICLE TEST BENCHES

BACKGROUND OF THE INVENTION

1. Field of the Invention

The present invention relates to a method and a device for simulating slip on vehicle test benches in accordance with the equation $F_R = F_A \times$ the coefficient of friction C of a vehicle wheel rolling on a test device such as a test roller or flat belt.

2. Description of the Related Art

In order to test antilock brake systems (ABS) on brakes, traction controllers on drive systems or electronic stability programs for preventing skidding, it is generally known to drive the respectively equipped vehicles over test routes. For this purpose there are slalom courses, circular courses, or oblique planes which can have various underlying surface coverings in different locations and the coefficient of friction can be partially reduced by water when necessary. It is thus possible, for example, to create different frictional conditions on the two sides of a vehicle and to generate slip between the tire and underlying surface on a drive side in a selective fashion. When such courses are driven, the vehicle may be caused to skid in a controlled fashion so that the effectiveness of the respective vehicle systems can be tested. However, such test journeys are dangerous for the driver and cannot be reproduced owing to the changing environmental conditions or the different performances of even the same drivers of different course paths so that these tests can only provide approximations for the further development of affected vehicle safety systems.

On vehicle test benches, for example, roller or flat belt test benches, it is possible to provide different surfaces with different coefficients of friction at the various wheels and water can be introduced between the tire and the test surface in order to reduce the coefficient of friction. For this purpose, the test bench devices must all be made corrosion-proof and complex feed systems and collecting systems for the water have to be provided. In order to change the basic conditions at the various wheels, it is necessary to reconfigure the entire test bench or replace the coatings of the testing surfaces. Another disadvantage is that the method in which the frictional force, which limits the maximum tractive force of a wheel, is changed by changing the coefficient of friction is difficult and cannot be set precisely and in addition only a static testing mode owing to the time delay when the surfaces dry.

SUMMARY OF THE INVENTION

It is an object of the present invention to change the frictional force between a wheel and a testing surface without necessarily having to change the coefficient of friction.

According to the invention, the contact force $F_A$ of the wheel on a moving test surface is changed in a predetermined manner by displacing the contact force from the tire to a lifting device as the wheel rotates.

This and other objects are achieved by the present invention, wherein it is possible in a particularly simple way to influence the transmissible tractive force of individual wheels and to simulate any desired load distributions among the various wheels such as occur during skidding, braking or acceleration of a vehicle.

Owing to the laboratory environment on the test benches, it is possible to repeat all the test runs as desired with identical settings, i.e. making the test runs reproducible.

The device according to the present invention makes both steady-state, i.e. static, and dynamic test runs possible in a particularly advantageous way.

The devices according to the present invention may be actuated and regulated using dedicated controlling and/or regulating devices, or can be advantageously integrated into an existing test bench controller.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
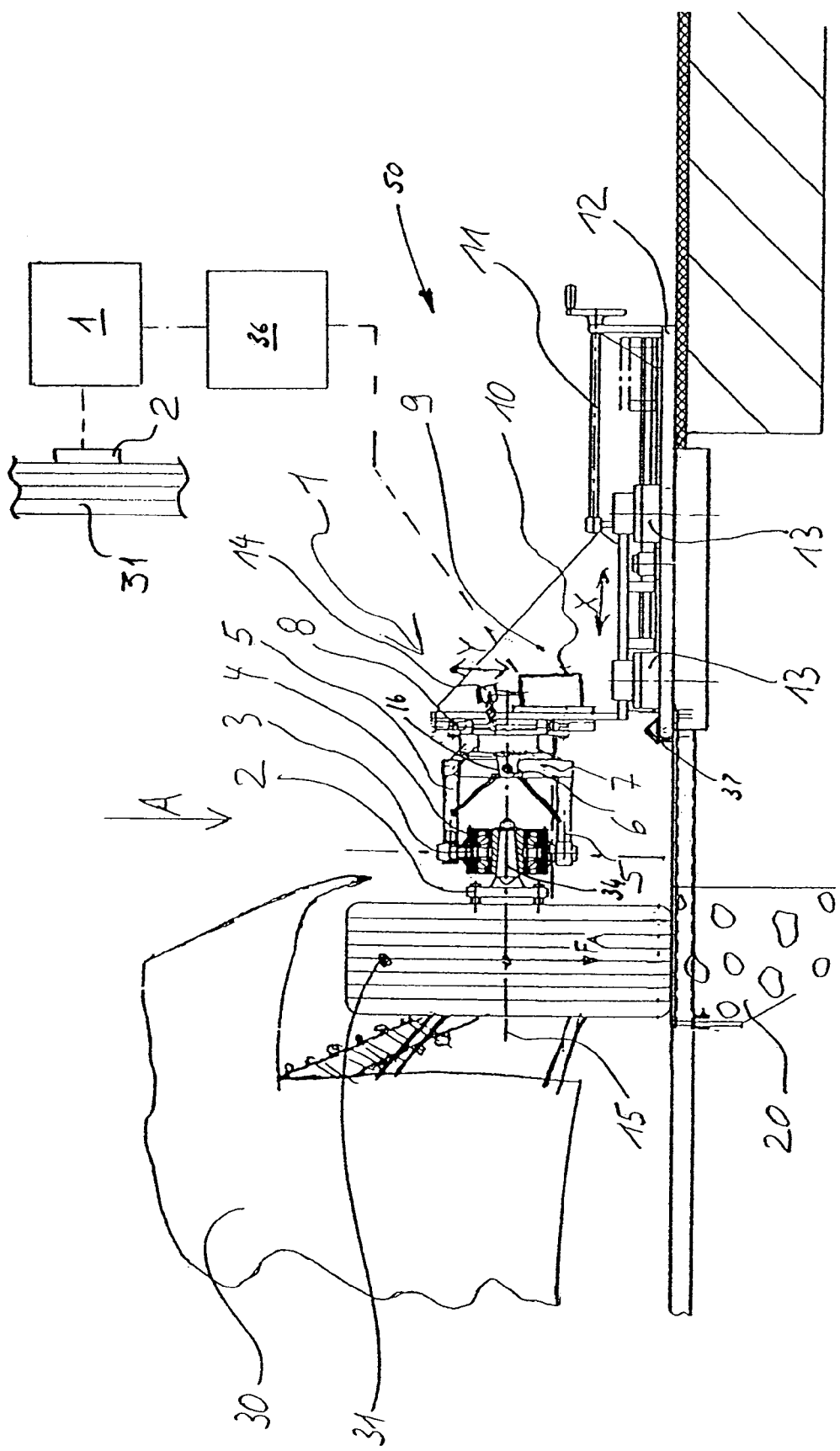
FIG. 1 is a partial elevational view of a test bench on which a wheel of a vehicle is located on a test roller.

FIG. 1 shows a wheel 31 of a vehicle 30 on a test surface, such as a test roller 20, i.e. test device. The illustrated test roller 20 is what is referred to as a vertex-type roller in which the wheels 31 roll approximately in the vertex region of the roller 20. However, other testing surfaces, for example flat belts, are also conceivable. The term test roller also includes all other conceivable testing surfaces as disclosed herein in the following description. The test roller 20 is preferably arranged in a pit underneath the vehicle 30 and can drive or brake the wheel 31 which includes a tire. For this purpose, a test bench controller can be provided, which can set, through actuation, different wheel loads corresponding to driving, braking, etc. on a test roller 20 in order to simulate various driving states such as acceleration, uphill travel, deceleration of the vehicle 30. The test bench 50 is preferably a standard version such as is usually provided for testing vehicles. In FIG. 1, the theoretical direction of travel of the vehicle 30 is perpendicular to the plane of the figure. Therein, axis 15 is the axis of rotation of the wheel 31 being represented by a dotted and dashed line.

So that the vehicle 30 does not move down from the test roller 20, the wheel 31 is secured by a lifting/lowering device 1 in the direction of travel and transversely thereto. For this purpose, the lifting/lowering device 1 is connected to the wheel hub of wheel 31 by a wheel adapter 2. The wheel adapter 2 is preferably attached to the rim of the wheel 31 by means of special wheel bolts which, on the one hand, clamp the wheel 31 onto the hub and, on the other hand, each have a further thread. Other attachment methods are of course also possible. The wheel adapter 2 is provided with, for example, a conical projection 34, which is held by a bearing unit 4 and secured in the radial and axial directions. The bearing unit 4 permits the wheel 31 to rotate about axis 15 of rotation, it being possible to take into account the bearing friction in test runs.

Figure 2:
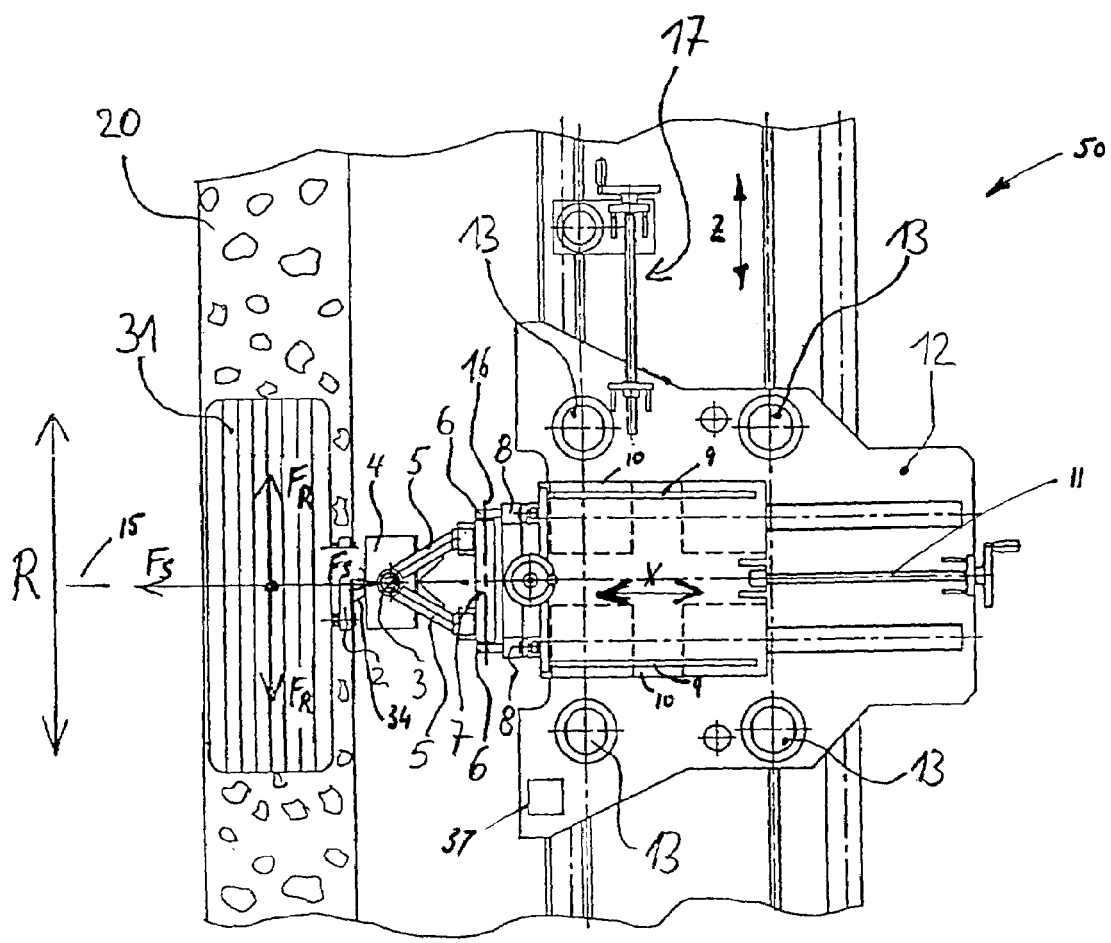
FIG. 2 is a partial cross-sectional view according to cross-section of FIG. 1 showing a test bench.

The bearing unit 4 is itself attached to rigid connecting arms 5 in such a way that it can rotate about an axis 3 so that it is possible to change the tracking of the wheel 31 such as may, for example, occur during spring compression owing to the kinematics of the chassis or during steering. The connecting arms 5 are, as is apparent from view A in FIG. 2, preferably embodied as triangular connecting arms and attached to a mount 7. In order to increase the rigidity, further struts (not shown) may also be provided. The mount 7 is supported in joint blocks 6, rotatable about a pivoting axis 16. Owing to the degrees of freedom about the pivoting axis 16, the wheel 31 can assume different kingpin angles such as are predefined by different vehicles 30 or corresponding to suspension responses such as spring compression, owing to the kinematics of the chassis. The directions R of travel of wheel 31 which are predefined by the test roller 20 are illustrated in FIG. 2 by a directional double arrow R. The orientation of the wheel 31 can also differ slightly from this depending on the steer lock or setting of the tracking of the vehicle 30.

The joint blocks 6 are arranged on a plate which can be moved in a vertical positioning direction Y using linear guides 8, and can be adjusted vertically using a linear drive 10. The joint blocks 6 can also be arranged directly on linear guides 8. In order to couple the wheel 31, provided with the wheel adapter 2, the bearing unit 4 can be moved with the linear drive 10 to the level of the axis 15 of rotation and pushed onto the wheel adapter 2 in a lateral adjustment direction X, where it is locked.

During the lifting, the contact force $F_A$ of the wheel 31 is displaced onto the linear drive 10, which is supported on a baseplate 12 via a supporting block 9. The baseplate 12 is secured, preferably to the floor, using attachment device 13. In order to adjust the position of the supporting block 9 in the lateral adjustment direction X, corresponding guides and an adjustment drive, for example an adjustment spindle 11, can be provided on the baseplate 12. In this way, the lifting/lowering device 1 can be adapted to different track widths of different vehicles 30 or the vehicle 30 can be moved onto the testing surface 20 laterally.

In order to orient the wheel 31 on the apex of the test roller 20, the baseplate 12 can be displaced in the direction R of travel using an adjustment device 17 when the attachment devices 13 are released.

In order to determine the holding force that is taken up by the lifting/lowering device 1, measuring devices, for example a force-measuring device 14, are provided on the linear drive 10.

In order to determine the contact force $F_A$, acting through the mass of the vehicle 30 on a wheel 31, the corresponding wheel 31 is lifted off the testing surface 20 using the lifting/lowering device 1 so that the measuring device 14 determines the appropriate value. By actuating the linear drive 10, the wheel 31 can be lifted in a continuous way, the holding force of the lifting/lowering device 1 being determined by the measuring device 14.

By subtracting this holding force from the previously determined contact force $F_A$, brought about by the mass of the vehicle, the contact force $F_A$ acting on the tire is obtained. This contact force FA acting on the test surface, i.e. test roller 20, limits the maximum frictional force $F_R$ between the tire, i.e. wheel 31, and test surface, i.e. test roller 20, according to the equation $$F_R = F_A \times \text{coefficient of friction } C$$

when the coefficient of friction C is constant. The maximum frictional force $F_R$ corresponds to the maximum possible tractive force $F_Z$ which can be transmitted by this wheel 31.

If the tire or the wheel 31 is loaded with a relatively high braking or driving force by the test roller 20, slip occurs between the wheel 31 and test roller 20, i.e. the circumferential speeds of the wheel 31 and test roller 20 are different. The transmissible frictional force is determined in this case by the lower coefficient of sliding friction so that the wheel 31 can then only transmit a fraction of the possible braking or driving force and lateral force to the test roller 20. In real road traffic, this causes, for example, the braking distance to become longer and/or the vehicle may be diverted from its direction of travel by a side wind, which may result in dangerous accidents.

On the test bench 50, the maximum tractive force $F_Z$ of the wheel tire 31 on the testing surface of test roller 20 can be measured, and the coefficient of friction can be calculated, by means of the known and previously determined set contact force $F_A$. In order to calculate the coefficient of friction and to actuate the lifting/lowering device 1 and/or to regulate the holding force of the lifting/lowering device 1 in order to set the contact force $F_A$ acting at the test roller 20, a separate controlling and/or regulating device 36 may be provided or the test bench's controller/regulator may be used.

If separate controlling and/or regulating devices 36 are provided for the lifting/lowering device 1, they may be easily incorporated into a test bench controller/regulator and it is possible to change the frictional conditions of a wheel 31 in a way which is adapted to predefined testing programs of the test roller 20.

A lifting/lowering device 1 is preferably provided at each driven wheel 31.

With the lifting/lowering device 1 it is also possible to lower the wheel hub or the wheel 31 so that the contact force $F_A$, and the frictional force $F_R$ or tractive force $F_Z$ associated with it are increased in a predetermined way, as is the case for example on the side of the vehicle 30 which is on the outside of a curve.

In order to determine the lateral force $F_S$ which can be transmitted to the wheel 31 given a predetermined contact force $F_A$, an adjustment drive which can be actuated and which can act on the wheel 31 laterally with an adjustable force during the drive loading or braking loading can be provided for the lateral adjustment device.

All drives which can be actuated and regulated, such as servo-electrical or servo-hydraulic as well as linear motors are possible as the linear drives for the lifting/lowering device 1. Manual adjustment devices such as adjustment spindles are also conceivable for steady-state, i.e. static, slip trial runs.

So that the coefficient of friction C can also be changed/varied in test runs, feed devices 37 such as nozzles, hoses or similar feeding devices for feeding fluids between the wheel 31 and the test roller 20 may be provided on the test bench 50.

In the exemplary embodiment described above, the axes of rotation for the degrees of freedom such as the kingpin angle or tracking are offset with respect to the corresponding axes on the chassis so that the vehicle 30 is somewhat offset, for example in the case of steering locks on the testing surface 20. In order to prevent this, it is possible to connect the connecting arms 5 to the bearing unit 4 in an articulated fashion such that instantaneous poles are produced which coincide with the respective axes of rotation of the chassis of vehicle 30.

A core of the present invention is to change the contact force $F_A$ of a tire, i.e. wheel 31, on a test roller 20 in a predetermined way in order to influence the possible tractive force $F_Z$ of the tire, i.e. wheel 31.

The present invention is not limited by the embodiments described above which are presented as examples only but can be modified in various ways within the scope of protection defined by the appended patent claims.

What is claimed is:

1. A device for simulating slip of a wheel on a vehicle test bench according to the equation $F_R = F_A \times C$, wherein $F_R$ is a frictional force, $F_A$ is a contact force of the wheel, and C is a coefficient of friction, the device comprising:
- a movable test surface to simulate rolling conditions of a wheel which contacts said test surface with a contact force $F_A$;
- a lifting and lowering device changing the contact force $F_A$ in a predetermined manner;
- a wheel adapter operable to couple said lifting and lowering device to said wheel while the wheel is mounted on a vehicle and so as to rotate with said wheel relative to said lifting and lowering device, whereby said wheel is tested in a mounted location on the vehicle;
- a bearing unit rotatable about a pivot axis extending transversely to an axis of rotation of the wheel adapter so as to change the track of the wheel, the wheel adapter being rotatably arranged in and coupled to the bearing unit;
- a mount pivotably mounted to joint blocks;
- a plurality of connecting arms connecting the bearing unit to the mount, said lifting and lowering device comprising
  - linear drives for lifting and lowering the joint blocks in linear guides in a predetermined way;
  - a supporting block on which the linear guides and the linear drives are arranged; and
  - a base plate for attaching the supporting block to an underlying surface.

2. The device for simulating slip of claim 1, wherein the lifting and lowering device can vertically adjust a hub of the wheel while the wheel is rotating.

3. The device for simulating slip of claim 1, wherein the lifting and lowering device holds the wheel with a holding force and is controllable by one of hydraulic pressure, electrical signals, and linear motors, the device for simulating slip further comprising means for measuring the holding force, whereby the holding force can be used to determine the contact force.

4. The device for simulating slip of claim 1, wherein the lifting and lowering device can follow a tracking/steering angle and a kingpin angle of the wheel, whereby the lifting and lowering device can secure the wheel in a direction transverse to the direction of travel.

5. The device for simulating slip of claim 1, further comprising means for changing the coefficient of friction.

6. The device for simulating slip of claim 5, wherein the means for changing the coefficient of friction comprise a nozzle for introducing water between the wheel and the surface of the test device.

7. The device for simulating slip of claim 1, further comprising a controller for controlling the lifting and lowering device, the controller being integrated into a controller of the vehicle test bench.

8. The device for simulating slip of claim 1, further comprising a plurality of lifting and lowering devices for respective wheels, and a controller for connecting the lifting and lowering devices.

9. A method of simulating slip of a wheel on a vehicle test bench comprising a movable test surface for simulating rolling conditions of a wheel which contacts said surface with a contact force $F_A$, said method comprising displacing the contact force $F_A$ from the wheel to a lifting device in a predetermined way by lifting the wheel off the surface as the wheel rotates.

10. The method of simulating slip of claim 9, further comprising:
- completely displacing the contact force $F_A$ from the surface to said lifting device by lifting the wheel completely off the surface;
- determining the absolute value of the contact force $F_A$ by means of a measuring device while said wheel is completely off said surface;
- determining a maximum traction force $F_Z$ which can be transmitted to the surface based on said absolute value;
- calculating a coefficient of friction C with the equation $F_Z = F_A \times C$, where $F_A$ is the absolute value; and
- setting the friction force $F_R$ according to the equation $F_R = F_A \times C$ by controlling the contact force $F_A$.

11. The method of simulating slip of claim 10, wherein said maximum tractive force $F_Z$ is changed in accordance with a predefined test program.

12. The method of simulating slip of claim 10, wherein said coefficient of friction is changed in accordance with a predefined test program.

13. A device for simulating slip of a wheel on a vehicle test bench according to the equation $F_R = F_A = C$, wherein $F_R$ is a frictional force, $F_A$ is a contact force of the wheel, and C is a coefficient of friction, the device comprising:
- a movable test surface to simulate rolling conditions of a wheel which contacts said test surface with a contact force $F_A$;
- means for changing the contact force $F_A$ in a predetermined manner;
- means for changing the coefficient of friction;
- a wheel adapter operable to couple said means for changing the contact force $F_A$ to said wheel while the wheel is mounted on a vehicle and so as to rotate with said wheel relative to said means for changing the contact force $F_A$, whereby said wheel is tested in a mounted location on the vehicle; and
- a bearing unit rotatable about a pivot axis extending transversely to an axis of rotation of the wheel adapter so as to change the track of the wheel, the wheel adapter being rotatably arranged in and coupled to the bearing unit, said means for changing the contact force $F_A$ comprising means for lifting and lowering said bearing unit.

14. The device for simulating slip of claim 13, wherein the means for changing the coefficient of friction comprise a nozzle for introducing water between the wheel and the surface of the test device.

* * * * *